US011235799B2

(12) United States Patent
Oblizajek et al.

(10) Patent No.: US 11,235,799 B2
(45) Date of Patent: Feb. 1, 2022

(54) LIMIT CYCLE DETECTION AND CESSATION SYSTEM AND METHOD

(71) Applicant: GM GLOBAL TECHNOLOGY OPERATIONS LLC, Detroit, MI (US)

(72) Inventors: Kenneth L. Oblizajek, Troy, MI (US); John D. Sopoci, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 416 days.

(21) Appl. No.: 16/385,425

(22) Filed: Apr. 16, 2019

(65) Prior Publication Data

US 2020/0331521 A1    Oct. 22, 2020

(51) Int. Cl.
*B62D 5/04* (2006.01)

(52) U.S. Cl.
CPC ......... *B62D 5/0472* (2013.01); *B62D 5/0463* (2013.01)

(58) Field of Classification Search
CPC .............................. B62D 5/0472; B62D 5/0463
See application file for complete search history.

(56) References Cited

U.S. PATENT DOCUMENTS

| | | | | |
|---|---|---|---|---|
| 5,861,725 A * | 1/1999 | Endo | ................... | B62D 5/0463 318/434 |
| 8,010,258 B2 * | 8/2011 | Tanaka | ................... | F02D 41/22 701/48 |
| 9,120,500 B2 | 9/2015 | Oblizajek et al. | | |
| 9,885,638 B2 | 2/2018 | Oblizajek et al. | | |
| 2009/0294206 A1 | 12/2009 | Oblizajek et al. | | |
| 2010/0138109 A1 | 6/2010 | Wang et al. | | |
| 2011/0071729 A1 | 3/2011 | Oblizajek et al. | | |
| 2012/0061169 A1 | 3/2012 | Oblizajek | | |
| 2012/0150389 A1 | 6/2012 | Oblizajek | | |
| 2012/0173079 A1 | 7/2012 | Oblizajek et al. | | |
| 2013/0030654 A1 | 1/2013 | Oblizajek | | |
| 2018/0093703 A1 * | 4/2018 | Sasaki | ................... | B62D 6/10 |

OTHER PUBLICATIONS

Mehrabi N, Dynamics and model-based control of electric power steering systems [PhD thesis]. Waterloo: University of Waterloo; 2014.

* cited by examiner

*Primary Examiner* — Jacob D Knutson
(74) *Attorney, Agent, or Firm* — Lorenz & Kopf LLP (57) ABSTRACT

Systems and methods are provided for limit cycle detection and cessation. A control system generates a drive signal with at least one drive component. An actuator effects a response to the drive signal and a sensor measures the response. Characteristics of the drive signal and of the drive components are accessed by a controller. The characteristics are compared to a predetermined set of characteristics. When the characteristics fall within the predetermined set of characteristics, a magnitude of at least one of the characteristics is evaluated. When the magnitude exceeds a predetermined value indicative of the limit cycle, an action is undertaken to stop the limit cycle.

20 Claims, 4 Drawing Sheets

LIMIT CYCLE DETECTION AND CESSATION SYSTEM AND METHOD

TECHNICAL FIELD

The present disclosure generally relates to the detection and cessation of limit cycle phenomenon in systems and more particularly relates to systems and methods for improving the performance of electric power steering systems by avoiding the effects of limit cycles.

BACKGROUND

Various controlled dynamic systems may experience limit cycles where a closed trajectory in phase space has at least one other trajectory relative to it. Limit cycles may result in self-sustaining oscillations that impact the performance of the system. For example, the oscillations may be experienced by an operator or may have an effect on the performance objectives of the system.

One environment where limit cycles may arise is in a vehicle. Many vehicles include a steering system to enable the operator or a controller to maneuver or steer the vehicle. In one example, the steering system includes a steering linkage coupled to a hand wheel. The steering linkage transmits the operator input from the hand wheel to the one or more road wheels. In some instances, the steering wheel may transmit vibrations from the steering linkage to the operator, including oscillations that may result from limit cycles. Such vibrations may be undesirable to the operator and may be perceived as an indication that the system needs servicing.

Accordingly, it is desirable to provide systems and methods for detecting when the source of a vibration is a limit cycle. Furthermore, other desirable features and characteristics of the present invention will become apparent from the subsequent detailed description and the appended claims, taken in conjunction with the accompanying drawings and the foregoing technical field and background.

SUMMARY

In various embodiments, a system is provided for detection and cessation of limit cycles. The system includes a control system configured to generate a drive signal that comprises one or more drive components. An actuator is configured to effect a response to the drive signal. At least one sensor is configured to measure the response. At least one controller is configured to access characteristics of the drive signal and/or the drive component(s). The controller is configured to: compare at least one of the characteristics of the drive signal to a predetermined set of characteristics; determine whether the characteristics of the drive signal fall within the predetermined set of characteristics; evaluate, when the characteristics of the drive signal fall within the predetermined set of characteristics, a magnitude of at least one of the characteristics; and undertake, when the magnitude exceeds a predetermined value indicative of the limit cycle, an action to stop the limit cycle.

In another embodiment, the action to stop the limit cycle comprises interrupting at least one of multiple drive components.

In another embodiment, the action to stop the limit cycle comprises interrupting the drive signal.

In another embodiment, the characteristics of the drive signal comprise frequency, amplitude and proportionate contribution of multiple drive components.

In another embodiment, the controller is configured to modify the drive signal when the frequency is within a predetermined range and the magnitude does not exceed the predetermined value.

In another embodiment, the controller is configured to compare an actual value of the response received from the sensor(s) following modification of the drive signal to an expected value of the response to the modification of the drive signal.

In another embodiment, the action to stop the limit cycle comprises interrupting one or more of the drive components and/or the drive signal when the magnitude does not exceed the predetermined value and the actual value of the action is less than the expected value of the action.

In another embodiment, the response comprises torque.

In another embodiment, the actuator comprises a motor.

In another embodiment, the controller is configured to determine whether the characteristics of the drive component(s) disproportionally contribute to the drive signal.

In various other embodiments, a method is provided to detecting and ending limit cycles. The method for detecting a limit cycle includes generating, by a control system, a drive signal. An actuator effects a response to the drive signal. At least one controller accesses characteristics of the drive signal and/or characteristics of at least one component of the drive signal. At least one sensor measures the response. The controller compares the characteristics of the drive signal to a predetermined set of characteristics and/or the characteristics of the one or more components to the drive signal in its entirety. The controller determines whether the characteristics of the drive signal fall within the predetermined set of characteristics and/or whether a magnitude of the at least one component is disproportionate to the drive signal in its entirety. When the characteristics of the drive signal fall within the predetermined set of characteristics indicative of the limit cycle, the controller determines an action to stop the limit cycle.

In an additional embodiment, the action to stop the limit cycle comprises interrupting at least one of the multiple components.

In an additional embodiment, the action to stop the limit cycle comprises interrupting the drive signal.

In an additional embodiment, the characteristics of the drive signal comprise a frequency and amplitude.

In an additional embodiment, the magnitude comprises amplitude. The controller modifies the drive signal when the amplitude does not exceed the predetermined value.

In an additional embodiment, the controller determines an expected value of the response following the modification of the drive signal. The controller receives an actual value of the response from the sensor following modification of the drive signal. The controller compares the actual value to the expected value.

In an additional embodiment, the controller interrupts the at least one of the drive component and/or the drive signal as the action to stop the limit cycle when: the magnitude does not exceed the predetermined value, and the actual value of the response is less than the expected value of the response.

In an additional embodiment, the action comprises torque, the sensor comprises a torque sensor, and the actuator comprises a motor. In an additional embodiment, the controller determines whether one of the multiple drive components disproportionally contributes to the drive signal.

In an additional embodiment, a method detects a limit cycle. A control system of a steering system generates a drive signal comprising multiple drive components. A motor effects a torque on the steering system in response to the drive signal. At least one controller assesses frequency and amplitude of the drive signal. A torque sensor measures the torque on the steering system. The controller compares the frequency of the drive signal to a predetermined range of frequencies. The controller determines whether the frequency falls within the predetermined range of frequencies. When the frequency falls within the predetermined range of frequencies, the controller evaluates whether the amplitude indicates saturation of the drive signal. When saturation is determined to exist indicative of the limit cycle, the controller triggers an action to stop the limit cycle. When the amplitude does not indicate saturation, the controller varies the drive signal. The controller receives an actual value of the torque from the torque sensor following the variation. The controller compares the actual value to the expected value. When the actual value is different than an expected value indicative of the limit cycle, the controller triggers the action to stop the limit cycle. The action comprises at least one of: a. suspending one or more of multiple drive components; and b. suspending the drive signal.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
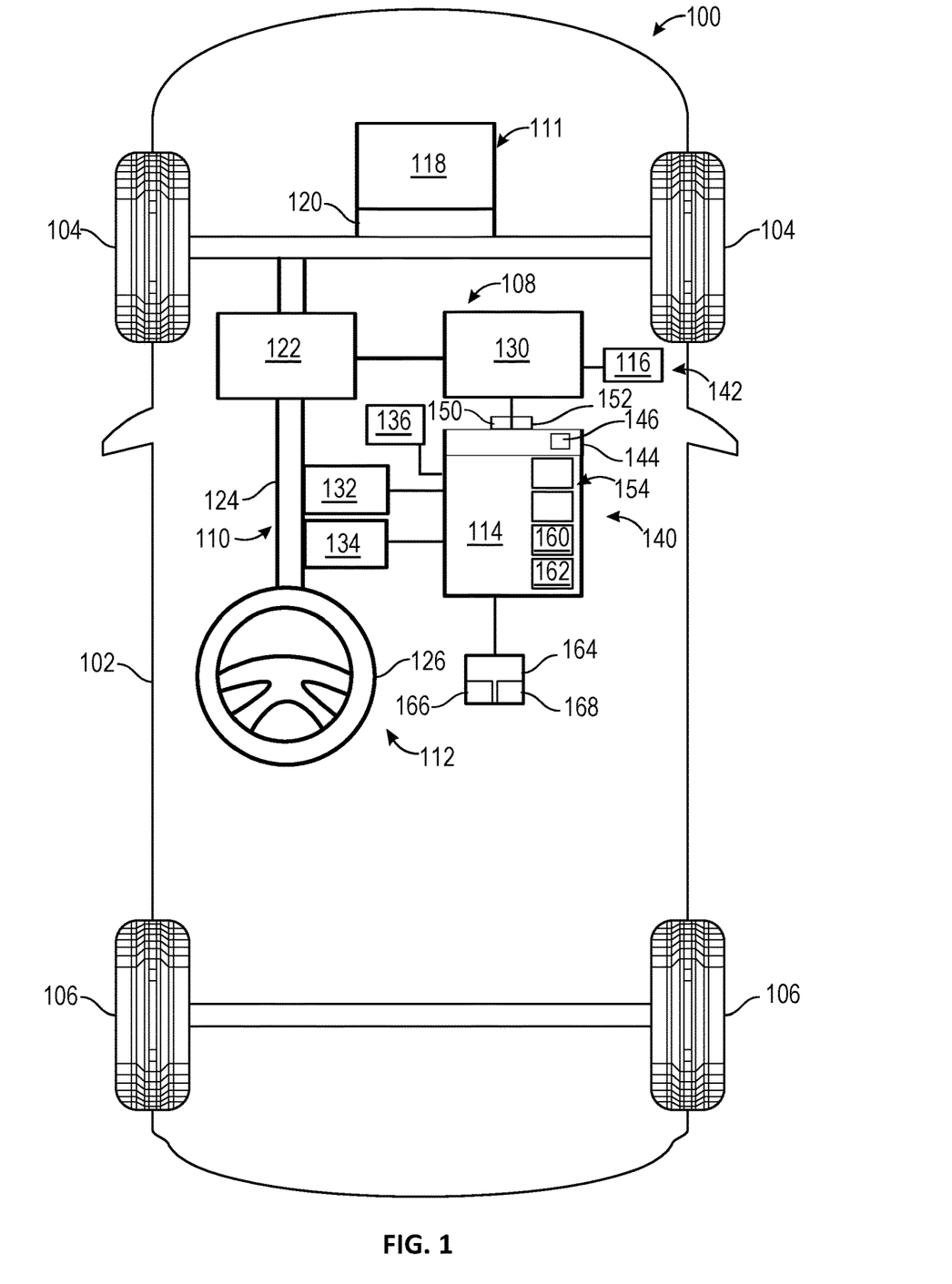
FIG. 1 is a functional block diagram of a system of a vehicle with a system for detecting and stopping limit cycles in a steering system, in accordance with various embodiments.

With reference to FIG. 1, illustrated is one example of a system 110 for detecting and stopping limit cycles of a steering system 112. As will be discussed further herein, the system 110 enables the detection and cessation of limit cycles of the steering system 112 to improve performance of the steering system 112. The steering system 112 is but one example of a system that may experience undesirable limit cycles for which the system 110 is applicable. The disclosed system 110 is useful in the applications described herein, because it eliminates unwanted vibrations that arise due to limit cycles. The current disclosure is applicable to other applications where improved performance of a system is desired by ending limit cycles when they have been detected. So, although described in the passenger vehicle steering system context, various features and characteristics disclosed herein may be used in other contexts and applications where limit cycle detection and/or cessation is useful. For example, various other mechanical and electro-mechanical system environments, as well as different types of controlled systems will benefit from the features described herein. Thus, no particular feature or characteristic is constrained to a passenger vehicle or to a steering system, and the principles are equally embodied in other vehicles, or in other machinery or equipment, and in other applications.

In some embodiments, the steering system 112 is associated with a vehicle 100. In various embodiments, the vehicle 100 may be an automobile, such as a car, a sport utility vehicle, a truck, or another ground vehicle. In other applications, the vehicle may be an aircraft, a spacecraft, a watercraft, or any other type of vehicle. For exemplary purposes the disclosure will be discussed in the context of the steering system 112 being used with an automobile as the vehicle 100. As depicted in FIG. 1, the vehicle 100 generally includes a body 102, front wheels 104, rear wheels 106, an electrical system 108 and a powertrain 111. The body 102 may be arranged on, or integrated with, a chassis and substantially encloses the other components of the vehicle 100. In general, the electrical system 108 includes a controller 114 and power supply with a battery 116. The powertrain 111 includes an engine 118 and a transmission 120. The wheels 104, 106 are each rotationally coupled to the vehicle 100 near a respective corner of the body 102.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

The steering system 112 includes a steering column 124 and a steering wheel 126. In various embodiments, the steering system 112 further includes various other features (not depicted in FIG. 1), such as a steering gear, intermediate connecting shafts between the column and the gear, connection joints, either flexible or rigid, allowing desired articulation angles between the intermediate connecting shafts, and tie-rods. The steering gear in turn, may comprise a rack, input shaft, and internal gearing. In various embodiments, the above described methods and systems can also be implemented for steer-by-wire systems. Steer-by-wire systems use electrical and/or electro-mechanical systems to control the vehicle (e.g., steering) instead of traditional mechanical linkages. For example, a steer-by-wire system can use electromechanical actuators and human-machine interfaces (e.g., a steering feel emulator, etc.) to control the vehicle. Accordingly, mechanical components such as the steering intermediate shaft and other associated components are not needed to control the vehicle.

In various embodiments, the steering system 112 is an electric power steering system (EPS) that includes an actuator, which in this embodiment is a motor 130, that is coupled to the steering system 112, and that provides torque or force to a rotatable or translational member of the steering system 112 (referred to as assist torque). The motor 130 may be coupled to an effector 122, such as a gear that drives a rotatable shaft of the steering column 124 or a rack of the steering gear. In the case of a rotary motor, the motor 130 may be connected through a geared or belt-driven configuration as the effector 122 enabling a favorable ratio of motor shaft rotation to either column shaft rotation or rack linear movement. The steering system 112 in turn influences the steerable front road wheels 104 during steering based upon the assist torque received from the motor 130 along with any torque received from a driver of the vehicle 100 via the steering wheel 126.

The steering system 112 further includes one or more sensors that sense observable conditions of the steering system 112 and of other aspects of the vehicle 100. In various embodiments, the steering system 112 includes a torque sensor 132, a steering position sensor 134 and a speed sensor 136. The torque sensor 132 senses a rotational torque applied to the steering system including for example, by a driver of the vehicle 100 via the steering wheel 126 and generates torque signals based thereon. The steering position sensor 134 senses an angular position of the steering system 112 and generates a sensor signal based thereon. The speed sensor 136 senses speed of the vehicle 100, such as at a rotating shaft in the driveline, for example at the transmission 120, and generates a sensor signal based thereon. The controller 114 receives the sensor signals and controls operation of the steering system 112 based thereon. In general, the controller 114 generates control signals for the motor 130 to control the amount of motor torque provided to the steering system 112, for example, to drive the motor 130 to provide torque assist for the driver of the vehicle 100. In various embodiments, the controller 114 includes any number of modules 154 that are communicatively coupled, such as by way of a communication bus. The control logic of the steering system 112 may reside on any one of the control modules and/or in a separate controller or controllers. For example, the vehicle 100 may include a number of control modules to control various aspects such as of the steering system 112, along with those of the powertrain 111, the body 102, braking for the wheels 104, 106, and other functions and systems of the vehicle 100. Additionally, one or more network communications protocols such as CAN or Flexray communication may be used to interface with the various control modules in the vehicle 100.

In general, the steering system 112 includes a control system 140 that includes the controller 114, which may be a microcontroller in communication with other controllers, a power supply 142 including the battery 116, and a motor driver 144, which may include devices such as power transistors 146 for operating the motor 130. The motor driver 144 may reside in any of the previously mentioned control modules, or in a stand-alone module. Torque may be controlled through current feedback from the power stage of the motor 130. In some embodiments, individual power supply monitor sensors 150, 152 may be provided for each of the voltage rails of the power supplied to drive the motor 130. The control system 140 includes a number of modules 154 as further described below.

The controller 114 may accept information from various sources, process that information, and provide control commands based thereon to effect outcomes such as operation of the vehicle 100 and its systems, including the steering system 112. In the depicted embodiment, the controller 114 includes a processor 160 and a memory device 162, and is coupled with a storage device 164. The processor 160 performs the computation and control functions of the controller 114, and may comprise any type of processor or multiple processors, single integrated circuits such as a microprocessor, or any suitable number of integrated circuit devices and/or circuit boards working in cooperation to accomplish the functions of a processing unit. During operation, the processor 160 executes one or more programs 166 and may use data 168, each of which may be contained within the storage device 164 and as such, controls the general operation of the controller 114 in executing the processes described herein, such as the processes described further below in connection with FIG. 5.

The memory device 162 may be any type of suitable memory. For example, the memory device 162 may include volatile and nonvolatile storage in read-only memory (ROM), random-access memory (RAM), and keep-alive memory (KAM), for example. KAM is a persistent or non-volatile memory that may be used to store various operating variables while the processor 160 is powered down. The memory device 162 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 114. In certain embodiments, the memory device 162 may be located on and/or co-located on the same computer chip as the processor 160. In the depicted embodiment, the memory device 162 may store the above-referenced programs 166 along with one or more stored values of the data 168 such as for short-term data access.

The storage device 164 stores data, such as for long-term data access for use in automatically controlling the vehicle 100 and its systems. The storage device 164 may be any suitable type of storage apparatus, including direct access storage devices such as hard disk drives, flash systems, floppy disk drives and optical disk drives. In one exemplary embodiment, the storage device 164 comprises a source from which the memory device 162 receives the programs that execute one or more embodiments of one or more processes of the present disclosure, such as the steps of the process 200 (and any sub-processes thereof) described further below in connection with FIG. 5. In another exemplary embodiment, the programs 166 may be directly stored in and/or otherwise accessed by the memory device 162. The programs 166 represent executable instructions, used by the electronic controller 114 in processing information and in controlling the vehicle 100 and its systems, including the control system 140. The instructions may include one or more separate programs, each of which comprises an ordered listing of executable instructions for implementing logical functions. The instructions, when executed by the processor 114 support the receipt and processing of signals such as from sensors, and the performance of logic, calculations, methods and/or algorithms for automatically controlling the components and systems of the vehicle 100. The processor 114 may generate control signals for the motor 130, and to automatically control various components and systems of the vehicle 100 based on the logic, calculations, methods, and/or algorithms. As will be appreciated, the data storage device 164 may be part of the controller 114, separate from the controller 114, part of one or more of the controllers, or part of multiple systems. The memory device 162 and the data storage device 164 work together with the processor 160 to access and use the programs 166 and the data 168.

While the components of the control system 140 are depicted as being part of the same system, it will be appreciated that in certain embodiments these features may comprise multiple systems. In addition, in various embodiments the control system 140 may comprise all or part of, and/or may be coupled to, various other vehicle devices and systems, such as, among others, the steering system 112 or more other systems of the vehicle 100.

Figure 2:
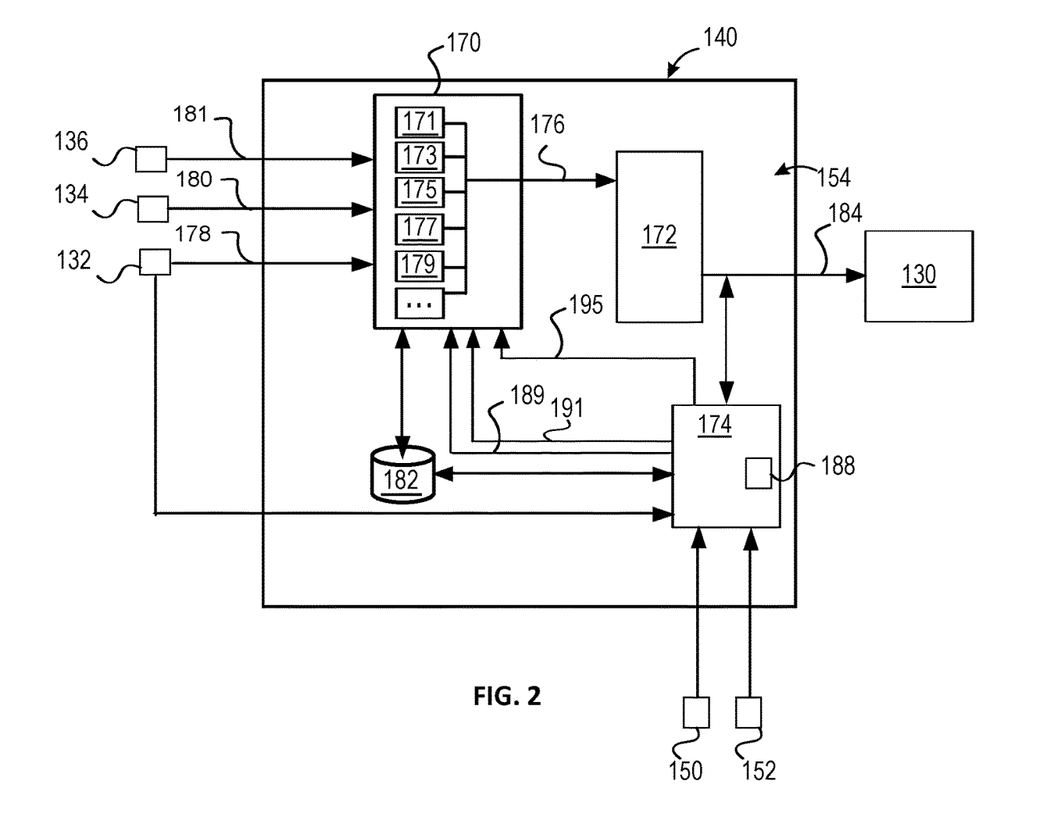
FIG. 2 is a functional block diagram of a system for detecting and stopping limit cycles, in accordance with various embodiments.

As shown in more detail with regard to FIG. 2, the control system 140 may include a number of modules 154 including a current command module 170 for controlling various aspects of the system 110, a driver module 172 for supplying the commanded current to the actuator, and a monitor and evaluate module 174 to perform a watchdog function, along with other various modules and resources for controlling the steering system 112. In various embodiments, the control system 140 and the steering system 112 may be coupled directly to the vehicle 100 as shown in FIG. 1. For example, when coupled to the vehicle 100, the current command module 170, the driver module 172, and the monitor and evaluate module 174 are coupled to a communication bus associated with the controller 114 and have access to read and generate information associated with the steering system 112. The driver module 172 may include the power amplifiers, multiphase power signals for polyphase motors, etc. to drive the motor 130 at a higher current and with the appropriate characteristics than the current command module 170 is capable of delivering.

In various embodiments, with the systems 110, 112, 140 energized, the current command module 170 generates a target current command 176 to control the amount of motor torque provided to the steering system 112. A number of submodules 171, 173, 175, 177, 179, . . . (etc.), may be included in the current command module 170 as various components of the control scheme/algorithms for various functions in controlling the current supplied to the steering system 112. For example, one submodule 171 may provide a component for the function of base assist to control the motor 130 to provide steering force as a function of the torque applied to the steering system 112 by the driver. This function assists the driver in turning the front wheels 104, for example by moving a steering gear or rack. The target current command 176 includes a drive component delivered by the submodule 171 when the driver provides an input by turning the steering wheel 126. Another submodule 173 may provide a drive component for friction compensation to counter inherent friction of including an electric power steering drive/rack. A drive current component may be applied as a constant force, or selectively applied force. Another submodule 175 may provide a drive component for damping compensation to manage damping of an electric power steering drive/rack. Another submodule 177 may provide a drive component for SRS (smooth road shake) mitigation to mitigate any oscillatory feedback from a vehicle's steered corners returning through the steering system. Such feedback may be caused by a non-uniformity of the steered tire/wheel assemblies, such as at their first-order rotational frequencies. Another submodule 179 may provide a drive component for return-to-center to apply a force to the steering system 112, such as to its rack, proportionate to the displacement of the rack from its center (straight ahead driving) position. Additional submodules . . . (etc.) or other submodules may be used in the control scheme/algorithms of the current command module 170 for other functions, each of which supplies a component of the drive signal. The individual components 171, 173, 175, 177, 179, etc. are summed to provide the target current command signal 176. For example, the driver may provide a steering input and the target current command signal will include components from the driver input submodule 171, the friction compensation submodule 173, the damping submodule 175 and the return to center submodule 179. If feedback is encountered, the target current command signal 176 may also include a component from the SRS mitigation submodule 177. In other embodiments, different submodules may provide components for any function of interest in controlling the steering system 112. It should be understood that in other embodiments a controlled system with actuators for uses other than steering will have submodules directed to functions of the particular system and its application.

In a number of embodiments, when the steering system 112 is used to turn the vehicle 100, the torque of the steering column 124 is measured by the torque sensor 132, which is delivered to the current command module 170 via a torque signal 178 along with a steering angle signal 180 as delivered from the steering position sensor 134. The current command module may also be supplied with a steering speed signal from a sensor (not shown) or by calculating the change in steering angle over time. The current command module 170 determines target current for the motor 130 based on characteristic curves determined during development of the steering system 112 and stored by a datastore 182, such as in the data storage device 164. The data may be stored in lookup tables or another form and includes values corresponding to various torques. In some embodiments, speed of the vehicle 100 through signal 181 as detected by the speed sensor 136 may also be considered, along with other parameters when desired. In various embodiments, the current command module 170 generates target current command 176 determined to provide the desired amount of torque assist to assist the driver in steering the vehicle 100 based directly on the determined performance metrics of the system and/or based on values derived from the methods and systems of the present disclosure, including for the components contributed by the submodules 171, 173, 175, 177, 179, etc. The target current command 176, representing the sum total from the submodules 171, 173, 175, 177, 179, etc., is delivered to the driver module 172, which uses the target current command 176 to deliver a drive signal 184 at the target current and system voltage to drive the motor 130, which delivers torque to the steering system 112.

In the current embodiment, the monitor and evaluate module 174, monitors the target current command signal 176 and the components thereof from the submodules 171, 173, 175, 177, 179, etc. The monitor and evaluate module 174 may also, or alternatively, monitor the drive signal 184. It should be understood that, regardless of where the monitoring occurs, the indications are equivalent since the drive components determine the target current command signal 176, which determines the drive signal 184. The monitor and evaluate module 174 monitors characteristics of the current, including the submodule components, as a watchdog function for the characteristics of interest about the current supplied to the motor 130. In some embodiments, amplitude and frequency of the drive signal 184 may be determined using the power supply monitor sensors 150, 152. In sum, the controller 114 obtains the amplitude and frequency of the current in the drive signal 184, whether using the output from the submodules 171, 173, 175, 177, 179, etc., the output from the current command module 170, or the output from the driver module 172, or from some other source. In addition, the current command module 170 inherently has the data on the target current command signal 176 and its drive components from the submodules submodules 171, 173, 175, 177, 179, etc.

In general, the monitor and evaluate module 174 provides a function that looks for limit cycles by monitoring the characteristics of the drive current to the motor 130. The characteristics of the drive current to the motor 130 may be determined from the commands issued by the submodules 171, 173, 175, 177, 179, etc., or by the current command module 170, since these commands determine the current that is delivered as the drive signal 184 by the driver module 172. Potential limit cycles are indicated by certain characteristics identified herein. In a mechanical system such as the steering system 112, excitation levels are expected to decay over time without an ongoing input of external energy. For example, a road input such as from a bump or depression will generate oscillations that are increasingly damped over time. An excitation that is sustaining over multiple cycles has an ongoing input of energy. It has been found that identifying limit cycles indicates when excitations are being self-sustained by the drive system of the motor 130 and may be used to trigger cessation measures (actions) to stop the limit cycle. Eliminating these oscillations improves control and the driver's feel of the steering system 112 such as through the steering wheel 126, and is a useful result in a practical application.

Figure 3:
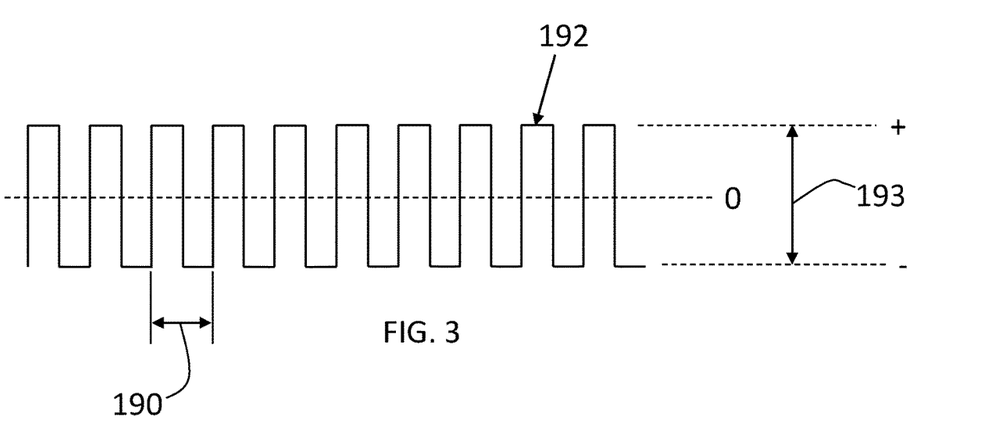
FIGS. 3 and 4 are graphs illustrating exemplary drive current characteristics used in determining limit cycles, in accordance with various embodiments.

With additional reference to FIG. 3, the monitor and evaluate module 174 looks for a frequency 190 of the motor drive current that is within a characteristic frequency band of interest for the steering system 112. For example, a limit cycle vibratory event may arise at a characteristic frequency response of the steering system 112. The characteristic frequency band is determined, such as by identifying critical frequencies using measurement methods or dynamic modeling with commercially available multibody dynamics software during development of the steering system 112. In the current embodiment, the characteristic frequency band has been determined to be 8-15 Hertz for the steering system 112. It will be appreciated that other systems may have a different characteristic frequency band. The monitor and evaluate module 174 includes, or is associated with, a bandpass function 188, which processes the drive signal 184 such as by using a bandpass filter with a passband frequency range. The bandpass function 188 identifies when frequencies of the current in the drive signal 184 are within the characteristic frequency band (e.g. 8-15 Hz.), which may be stored in the datastore 182 for reference. It should be understood that the monitor and evaluate module 174 may be a part of the current command module 170 and the control system 140 may be equipped with interrupt-driven code. In other words, because the drive signal 184 is generated as a result of operation of the current command module 170, the command deliveries to generate the drive signal 184 occur virtually simultaneously with the availability of information on the characteristics of the drive signal 184, which may be collected as the commands are generated.

When the drive signal frequency 190 is identified as falling within the characteristic frequency band, the monitor and evaluate module 174 may determine whether a rail-to-rail excursion is occurring, such as illustrated in FIG. 3. For example, the current is saturated going to maximum authority and minimum authority "rail-to-rail" delivering the maximum current possible in driving the motor 130. When a rail-to-rail excursion is occurring, the saturated current signal approaches a virtual square wave profile 192 due to its amplitude 193. It should be appreciated that saturation may result from causes other than limit cycles. For example, encountering a pothole while turning the vehicle 100 may call for a maximum torque condition. Accordingly, the duration of the saturation is checked to verify the source is a limit cycle. The monitor and evaluate module 174 determines whether the saturation is sustained for a minimum period. For example, if the saturation persists for a period one second, then it is sustained for 8-15 cycles and a conclusion may be drawn that it indicates the saturation is being self-sustained by an instability in the drive system. This also indicates corrective action is needed. In such an occurrence the driver of the vehicle 100 may feel a heavy steering condition with less power assist than normal, and therefore, correction is beneficial.

Figure 4:
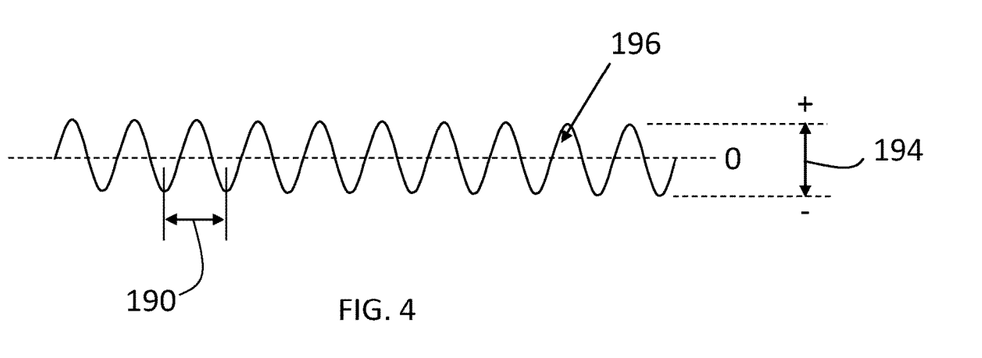

To consider other cases, when the monitor and evaluate module 174 identifies the frequency 190 is within the characteristic frequency band and a saturated rail-to-rail condition does not exist, a determination is made of whether a limit cycle exists due to other conditions such as nonlinearities. With reference to FIG. 4, the frequency 190 is again within the characteristic frequency band, in this example 8-15 Hz. The amplitude 194 of the current is less than rail-to-rail in the quasi-sinusoidal wave 196. To perform an evaluation under these conditions, the current of the drive signal 184 is varied for a brief period, such as by signaling the current command module 170 with a modify signal 195 to reduce the target current signal 176 within the characteristic frequency band. This reduces the current within the band an amount corresponding to a detectable level of torque on the steering system 112. The torque sensed by the torque sensor 132 is monitored and if the actual amount of the band-limited torque increases as a result of the reduction in current, then this indicates lower assist from the motor 130 as is expected to occur from reducing current. If actual band-limited torque does not increase or there is a reduction in the band-limited torque, then this indicates that a limit cycle condition exists. Non-limit cycle conditions are excluded from triggering a needed action.

In sum, a first needed action condition is triggered when the frequency 190 falls within the characteristic frequency band and the amplitude is saturated for the period of time. A second needed action condition is triggered when the frequency 190 falls within the characteristic frequency band, the amplitude is not saturated, and an unexpected torque response results from a modification of the current. To initiate a responsive action to stop the limit cycle condition, the monitor and evaluate module 174 delivers an interrupt signal 189, 191 to the current command module 170 to suspend the drive signal 184 or a component thereof. For example, the current command module 170 identifies the interrupt signal 189, 191 and selects the corresponding corrective action.

One action may be to identify whether one submodule 171, 173, 175, 177, 179, etc. is the cause of, or has a high participation in, driving the instability of the limit cycle and then suspend only that particular submodule. For example, only one submodule may be suspended instead of suspending the entire control algorithm or its cumulative output. Doing so means that current continues to be supplied to the motor 130, and is diminished by the suspended component only. In analyzing the submodules 171, 173, 175, 177, 179, etc., the output of each is individually compared to the total output from the current command module 170 and if one module has a disproportionate contribution it is suspended. For example, on a relative percentage basis, if one submodule is responsible for a majority of the total drive current then it is indicated as a source of a limit cycle. If after the component is suspended, the limit cycle is still occurring, then the entire drive signal 184 to the motor 130 may be temporarily suspended.

When one of the submodules 171, 173, 175, 177, 179, etc., is found to have a disproportionate contribution to the entire drive signal 184, as a responsive action the monitor and evaluate module 174 delivers an interrupt signal 189 to the current command module 170 to suspend that submodule 171, 173, 175, 177, 179, etc. that is identified as a disproportionate contributor. If the frequency 190 is no longer within the characteristic frequency band or the amplitude 194 is diminished to a desired threshold, the source of the limit cycle has been identified.

Another action may be to suspend the entire drive signal 184 to the motor 130 for a period of time. This action may be undertaken when the frequency remains within the characteristic frequency band after suspending the submodule that was identified as a disproportionate contributor. For example, the drive signal 184 is suspended for a period of time such as by the current command module 170, terminating the target current command 176. This stops the drive signal 184. Power is terminated when an off/on cycle may be accomplished quickly without an undue time lag in reinstating control of the control system 140. In a system such as the steering system 112, the period of time is selected to deliver control for stable near-continuous operation. For example, halting the drive signal 184 for one to two tenths of a second provides for attenuation over at least one completed cycle in the 8-15 Hz cycle range and provides for cessation of the limit cycle condition in a period not perceivable by the driver. At the end of the 0.1-0.2 second period, the current command module 170 reinstates the drive signal 184 and the steering system 112 continues to operate without the limit cycle condition. The required cessation period may depend on the particular designed vehicle and steering system; the desire is to minimize the cessation period while assuring adequate time to interrupt the source of the limit cycle. Thus cessation periods departing from the example one to two tenths of a second may be used.

Figure 5:
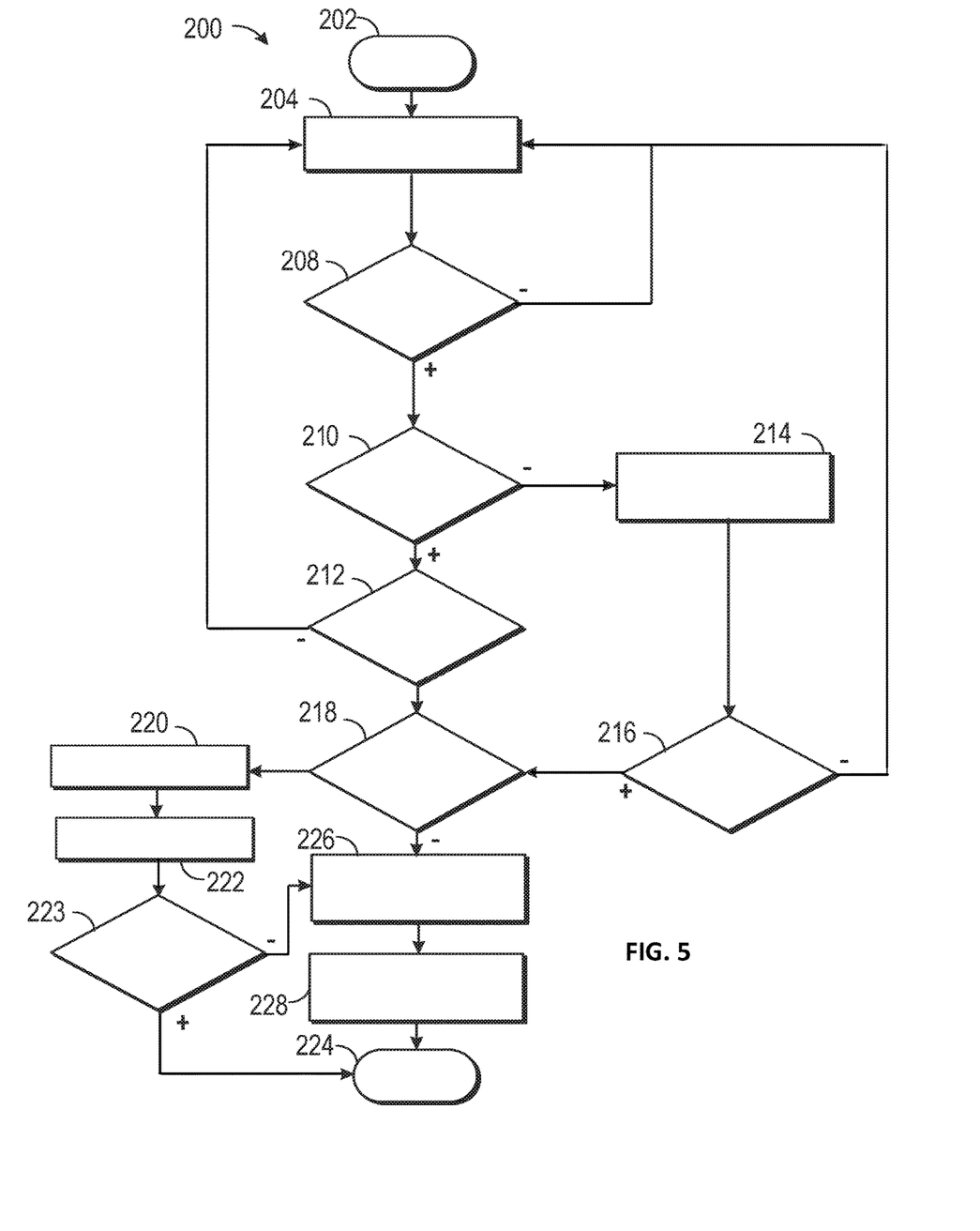
FIG. 5 is a flowchart illustrating a method that may be performed by the system for detecting and stopping limit cycles, in accordance with various embodiments.

With reference now to FIG. 5, a flowchart of a process 200 with methods for detecting and stopping limit cycles is depicted. The process 200 may be utilized in connection with the vehicle 100 and the steering system 112 of FIGS. 1 and 2, in accordance with exemplary embodiments. As can be appreciated in light of the disclosure, the order of operation within the method is not limited to the sequential execution as illustrated in FIG. 5, but may be performed in one or more varying orders as applicable and in accordance with the present disclosure.

As depicted in FIG. 5 along with FIGS. 1-4, the process 200 may begin at 202 with the vehicle 100 and the steering system 112 in operation. The process 200 monitors 204 torque through the torque sensor 132, steering angle through the steering position sensor 134, and the current supplied to the electric motor 130, such as through the controller 114, and/or the driver 144. At 204 the process 200 may also monitor speed of the vehicle such as through the speed sensor 136 and may monitor other parameters of interest, which in some embodiments may include obtaining the drive signal frequency and amplitude such as through the power supply monitor sensors 150, 152, or directly through the controller 114. For example, the controller 114 commands the supplied current through the target current command 176 and thereby has access to the characteristics of the current in the drive signal 184 including determining the components in the submodules 171, 173, 175, 177, 179, etc. The command deliveries to generate the drive signal 184 may occur virtually simultaneously with the collection of information on the characteristics of the drive signal 184 within the controller 114. Accordingly, the process 200 has access to the frequency and amplitude of the drive signal 184, the determinations made in composing the target current command 176, and the torque on the steering system 112. The drive signal 184 is delivered to the motor 130 with current based on the required torque. The required torque may vary depending on the steering angle, driver inputs, and speed of the vehicle 100. The control system 140 is equipped with interrupt-driven code so that command deliveries to generate the drive signal 184 occur virtually simultaneously with the collection of information on the characteristics of the signal.

An evaluation 208 of the current supplied to the motor is conducted by the controller 114 to determine whether the frequency 190 of the drive signal is within a characteristic frequency band (e.g. 8-15 Hz.). When the determination is negative and the frequency 190 is not within the characteristic frequency band, the process 200 returns to monitor step 204 and proceeds therefrom. When the determination is positive and the frequency 190 falls within the characteristic frequency band, the process 200 then determines 210 whether a rail-to-rail excursion is occurring meaning the signal is saturated, such as illustrated in FIG. 3. When the determination is positive, and the signal is saturated, the process 200 proceeds to 212. As is typical, the controller 114 has access to a timing function and the duration of the saturation is checked 212. When saturation is sustained for a minimum period for example, if the saturation persists for a period one second, it indicates the saturation is being self-sustained by an instability in the drive system.

When the determination at 210 is negative, and the signal is not saturated, but the frequency 190 falls within the characteristic frequency band, the process 200 proceeds to modify 214 the current of the drive signal 184. When the current is modified 214, for example reduced in amplitude at the pass-band, a determination 216 is made of the effect on torque. For example steering torque (SWT) is evaluated by comparing values for phasor quantities of the resulting actual SWT ($SWT_a$) to the expected SWT ($SWT_e$) values. $SWT_a$ is obtained from the torque sensor 132. $SWT_e$ is calculated by the controller 114. In this embodiment, $SWT_e=H(f)*I(f)$, where H(f) is a pre-established frequency response and I(f) is drive command torque. The magnitude of the difference (d) is determined using $d=|SWT_a|-|SWT_e|$. When d<0, a limit cycle condition is indicated and the process 200 proceeds to 218.

Whether arriving at step 218 from step 212 or step 216, a determination 218 is made as to whether one of the components from the submodules 171, 173, 175, 177, 179, etc. is a disproportionate contributor. The determination 218 for example, evaluates whether on a relative percentage basis, one submodule is responsible for a majority of the total drive current. If so, that submodule is indicated as a candidate source of a limit cycle. When the determination 218 is positive, the process 200, through the current command module 170, proceeds to suspend 220 the submodule responsible for the disproportionate contribution. Following a period of time, such as 0.1-0.2 second the submodule is reinstated 222. A determination 223 is made as to whether the limit cycle has been eliminated, such as by determining whether the frequency 190 is still within the characteristic frequency band. If the determination is positive and the limit cycle has been eliminated, the process 200 continues to monitor such as by returning to monitor 204 the system 212, or may end 224.

When the determination is negative, and the limit cycle has not been eliminated, the process 200 proceeds to 226. Also, when the frequency 190 falls within the characteristic frequency band and the amplitude is saturated rail-to rail, or d<0, and a submodule is not a disproportionate contributor meaning the determination 218 is negative, the process 200 proceeds to 226. As a responsive action, at step 226 the drive signal 184 is interrupted by suspending it for a period of time such as 0.1-0.2 second for cessation of the limit cycle condition. At the end of the time period, the drive signal 184 is reinstated 228 and the steering system 112 continues to operate without the limit cycle condition with continued monitoring 204. The process 200 continues to run when the vehicle 100 is in operation or may end 224, such as when the vehicle 100 is powered down.

Accordingly, by monitoring the strength of the drive signal of a control system and measuring the response to the control system, systems and methods of detecting and stopping limit cycles are provided. For example, characteristics of the drive signal, its components, and resulting torque in the system are used to detect limit cycles, which are then brought to cessation by interrupting a component or the drive signal for a period of time. The control system provides continuous stable operation of the controlled system with short interruptions that are not perceivable within the context of the system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A system for detecting a limit cycle, comprising:
a control system configured to generate a drive signal that comprises at least one drive component;
an actuator configured to effect a response to the drive signal;
at least one sensor configured to measure the response; and
at least one controller configured to:
   access characteristics of at least one of the drive signal and the at least one drive component;
   compare at least one of the characteristics of the drive signal to a predetermined set of characteristics;
   determine whether the characteristics of the drive signal fall within the predetermined set of characteristics;
   evaluate, when the characteristics of the drive signal fall within the predetermined set of characteristics, a magnitude of at least one of the characteristics;
   undertake, when the magnitude exceeds a predetermined value indicative of the limit cycle, an action to stop the limit cycle; and
   modify the drive signal when the characteristics of the drive signal are within a predetermined range and the magnitude does not exceed the predetermined value.

2. The system of claim 1, wherein the at least one drive component comprises multiple drive components and the action to stop the limit cycle comprises interrupting at least one of the multiple drive components.

3. The system of claim 2, wherein the action to stop the limit cycle comprises interrupting the drive signal.

4. The system of claim 1, wherein the at least one drive component comprises multiple drive components and wherein the characteristics of the drive signal comprise frequency, amplitude and apportioned contribution of the multiple drive components.

5. The system of claim 1, wherein the characteristics of the drive signal include frequency.

6. The system of claim 5, wherein the controller is configured to compare an actual value of the response received from the at least one sensor following modification of the drive signal to an expected value of the response to the modification of the drive signal.

7. The system of claim 6, wherein the at least one drive component comprises multiple drive components, and wherein the action to stop the limit cycle comprises interrupting at least one of the multiple drive components and/or the drive signal when:
   the magnitude does not exceed the predetermined value; and
   the actual value of the action is less than the expected value of the action.

8. The system of claim 1, wherein the response comprises torque.

9. The system of claim 8, wherein the actuator comprises a motor.

10. The system of claim 1, wherein the controller is configured to determine whether the characteristics of the at least one drive component disproportionally contribute to the drive signal.

11. A method for detecting a limit cycle, comprising:
generating, by a control system, a drive signal;
effecting, by an actuator, a response to the drive signal;
accessing, by at least one controller, characteristics of the drive signal and/or characteristics of at least one component of the drive signal;
measuring, by at least one sensor, the response;
comparing, by the controller, the characteristics of the drive signal to a predetermined set of characteristics and/or the characteristics of the at least one component to the drive signal in its entirety;

determining, by the controller, whether the characteristics of the drive signal fall within the predetermined set of characteristics and/or whether a magnitude of the at least one component is disproportionate to the drive signal in the drive signal's entirety;

triggering, by the controller and when the characteristics of the drive signal fall within the predetermined set of characteristics indicative of the limit cycle, an action to stop the limit cycle; and modifying, by the controller, the drive signal when an amplitude in the characteristics of the drive signal does not exceed a predetermined value.

12. The method of claim 11, wherein the at least one component comprises multiple components, wherein the action to stop the limit cycle comprises interrupting at least one of the multiple components.

13. The method of claim 12, wherein the action to stop the limit cycle comprises interrupting the drive signal.

14. The method of claim 11, wherein the characteristics of the drive signal comprise frequency and amplitude.

15. The method of claim 11, wherein the characteristics of the drive signal comprise amplitude, and comprising triggering the action to stop the limit cycle when the amplitude indicates saturation of the drive signal.

16. The method of claim 15, comprising:

determining, by the controller, an expected value of the response after the modification of the drive signal;

receiving, by the controller and from the sensor, an actual value of the response following modification of the drive signal; and comparing, by the controller, the actual value to the expected value.

17. The method of claim 16, comprising:

interrupting, by the controller, one of the at least one component and/or the drive signal as the action to stop the limit cycle when: the magnitude does not exceed the predetermined value; and the actual value of the response is less than the expected value of the response.

18. The method of claim 11, wherein the action comprises torque, the sensor comprises a torque sensor, and the actuator comprises a motor.

19. The method of claim 11, comprising determining, by the controller, whether one of the at least one component disproportionally contributes to the drive signal.

20. A method for detecting a limit cycle, comprising:

generating, by a control system of a steering system, a drive signal comprising multiple drive components;

effecting, by a motor, a torque on the steering system in response to the drive signal;

accessing, by at least one controller, frequency and amplitude of the drive signal;

measuring, by a torque sensor, the torque on the steering system;

comparing, by the controller, the frequency of the drive signal to a predetermined range of frequencies;

determining, by the controller, whether the frequency falls within the predetermined range of frequencies;

evaluating, by the controller and when the frequency falls within the predetermined range of frequencies, whether the amplitude indicates saturation of the drive signal;

triggering, by the controller and when the saturation is determined to exist indicative of the limit cycle, an action to stop the limit cycle;

when the amplitude does not indicate the saturation, effecting a variation of the drive signal by the controller;

receiving, by the controller and from the torque sensor, an actual value of the torque following the variation;

comparing, by the controller, the actual value to an expected value; and triggering, by the controller and when the actual value is different than the expected value indicative of the limit cycle, the action to stop the limit cycle, wherein the action comprises at least one of (a) suspending one or more of the multiple drive components; and (b) suspending the drive signal.

* * * * *